United States Patent [19]

Daniel

[11] Patent Number: 4,749,317
[45] Date of Patent: Jun. 7, 1988

[54] TRAILER FOR TRANSPORTING AND STORAGE OF RECREATIONAL VEHICLES

[76] Inventor: Phillip G. Daniel, 131 Pinewood Dr., Tuttle, Okla. 73089-9803

[21] Appl. No.: 872,032

[22] Filed: Jun. 9, 1986

[51] Int. Cl.⁴ .............................................. B60P 3/08
[52] U.S. Cl. ...................................... 410/26; 410/24; 410/3; 414/482; 414/538; 414/462
[58] Field of Search ...................... 410/3, 4, 13, 24, 26, 410/27; 414/480, 482, 485, 537, 538, 462; 296/1 A, 50, 51, 57 R, 61

[56] References Cited

U.S. PATENT DOCUMENTS

| | | | |
|---|---|---|---|
| 2,930,500 | 3/1960 | Ellis | 414/462 |
| 3,025,985 | 3/1962 | Crawford | 410/3 |
| 3,677,425 | 7/1972 | Patten | 414/538 |
| 3,726,423 | 5/1973 | Miron | 414/480 |
| 3,871,540 | 3/1975 | Jenkins | 414/538 |
| 3,902,613 | 9/1975 | Newland | 410/3 |
| 4,531,879 | 7/1985 | Horowitz | 414/462 |

*Primary Examiner*—Kenneth J. Dorner
*Assistant Examiner*—Gerald A. Anderson
*Attorney, Agent, or Firm*—Bill D. McCarthy

[57] ABSTRACT

A trailer for transporting and storing recreational vehicles, such as three and four-wheeled motorcycle-type vehicles, is provided which comprises a substantially horizontally disposed lower frame assembly; wheel assemblies connected to and supporting the lower frame assembly; and an upper frame assembly spatially disposed above the lower frame assembly. The upper frame assembly is moveable between a substantially horizontally disposed first position and an angularly disposed second position. In the horizontally disposed first position the upper frame assembly is disposed a distance above the lower frame assembly so as to be substantially parallel with the lower frame assembly; and in the angularly disposed second position the upper frame assembly is angularly disposed above the first frame assembly such that a rearward end of the upper frame assembly is positioned substantially adjacent the lower frame assembly, in close proximity to a rearward end of the lower frame assembly. A winch assembly is supported by the lower frame assembly and connectable to a vehicle for selectively moving the vehicle to a loaded position on the upper frame assembly as the upper frame assembly pivots between the angularly disposed second position and the horizontally disposed first position, and for controllably releasing the vehicle to permit the vehicle to move to an unloaded position as the upper frame assembly pivots between the horizontally disposed first position and the angularly disposed second position.

40 Claims, 4 Drawing Sheets

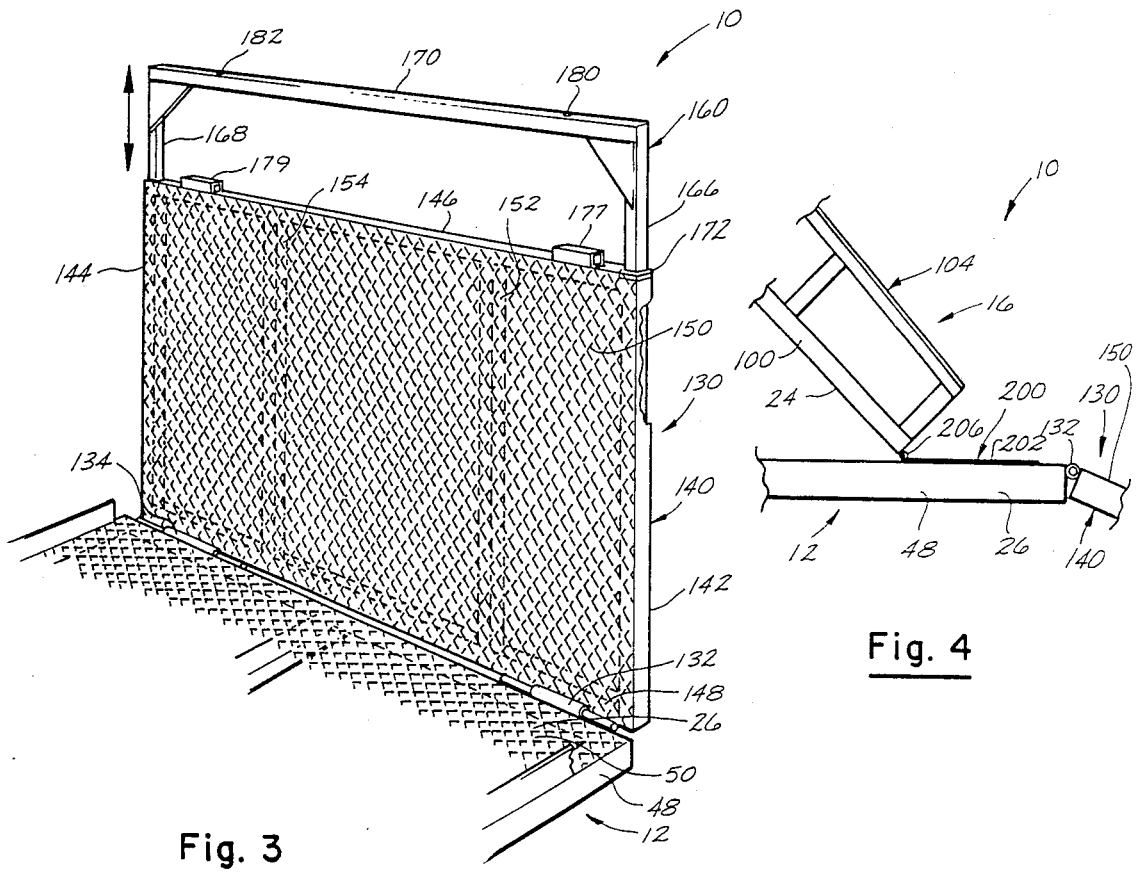
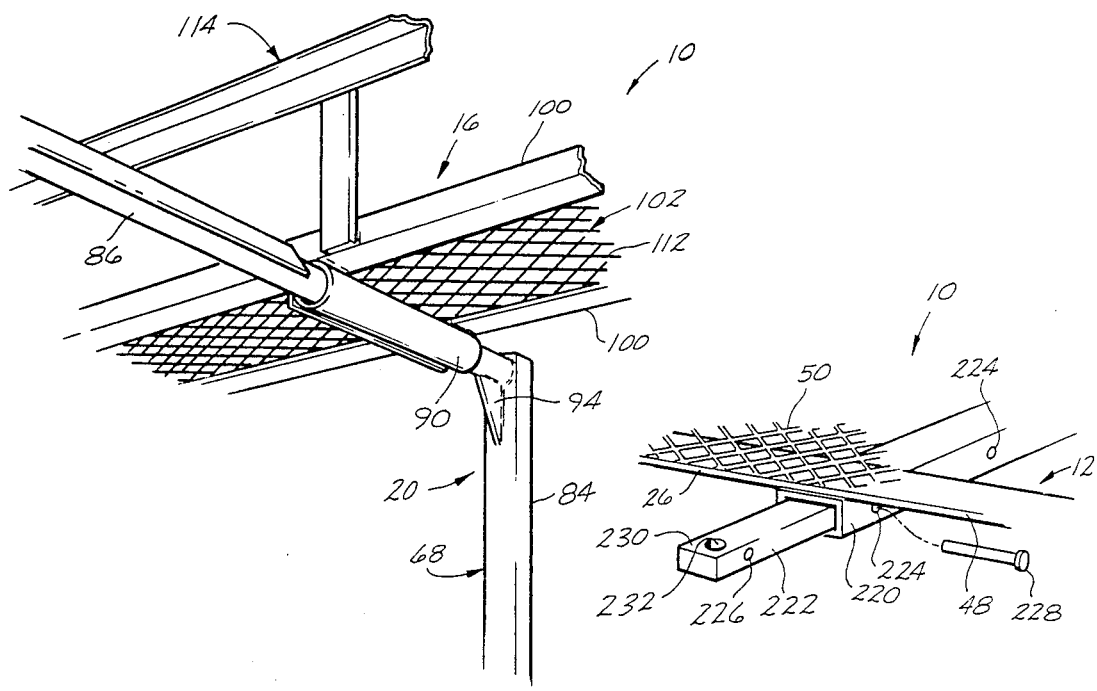
Fig. 3
Fig. 4
Fig. 5
Fig. 6

TRAILER FOR TRANSPORTING AND STORAGE OF RECREATIONAL VEHICLES

BACKGROUND OF THE INVENTION

1. Field of the Invention.

The present invention relates generally to the field of trailers, and more particularly, but not by way of limitation, to a trailer for transporting and storage of recreational vehicles, such as three and four-wheeled motorcycle-type recreational vehicles.

2. Brief Description of the Prior Art.

The prior art is replete with trailers for transporting various types of vehicles and goods. However, in recent years the popularity of off-the-road recreational vehicles, such as three and four-wheeled motorcycle-type vehicles, has become more widespread. As a result of the popularity of such vehicles, and their use in remote areas, a need has developed for a trailer capable of not only transporting a plurality of such recreational vehicles, but which is also capable of storing such vehicles when the vehicles are not in use to prevent unauthorized use or theft of such vehicles. However, it is desirable that such a trailer for transporting and storage of multi-wheeled recreational vehicles does not place an undue burden on the driver of the towing vehicle, while permitting the driver to readily load and unload the multi-wheeled recreational vehicles without endangering the user of the trailer or damaging the vehicles during the loading, unloading, and transportation of such vehicles. It is to such a trailer that the subject invention is directed.

SUMMARY OF THE INVENTION

According to the present invention a trailer for transporting and storing recreational vehicles, such as three and four-wheeled motorcycle-type vehicles, is provided. Broadly, the trailer comprises a substantially horizontally disposed lower frame assembly for transporting and storing at least one recreational vehicle, a wheel assembly rotatably connected to the lower frame assembly for supporting the lower frame assembly and providing travelling movement thereto, an upper frame assembly spatially disposed above the lower frame assembly for transporting and storing at least one recreational vehicle, and a support assembly for pivotally connecting the upper frame assembly to the lower frame assembly such that the upper frame assembly is movable between a substantially horizontally disposed first position and an angularly disposed second position. In the horizontally disposed first position the upper frame assembly is disposed a distance above the lower frame assembly so as to be substantially parallel with the lower frame assembly; and thus permits at least one of the recreational vehicles to be positioned on the lower frame assembly. In the angularly disposed second position the upper frame assembly is positioned such that a rearward end of the upper frame assembly is disposed substantially adjacent the lower frame assembly, in close proximity to a rearward end of the lower frame assembly. A winch assembly, which is supported by the lower frame assembly, is connectable to one of the vehicles for selectively moving the vehicle to a loaded position on the upper frame assembly as the upper frame assembly pivots between the angularly disposed second position and the horizontally disposed first position, and for controllably releasing the vehicle to permit the vehicle to move to an unloaded position as the upper frame assembly pivots between the horizontally disposed first position and the angularly disposed second position.

An object of the present invention is to provide a trailer for the transportation and storage of a plurality of recreational vehicles, such as three and four-wheeled motorcycle-type vehicles.

Another object of the present invention, while achieving the before stated object, is to provide a trailer for the transportation and storage of multi-wheeled recreational vehicles which can readily be towed by a driver of a family-type vehicle, and which is compact in size.

Another object of the present invention, while achieving the before stated objects, is to provide a trailer for the transportation and storage of a plurality of multi-wheeled recreational vehicles wherein the vehicles can be secured on the trailer, when such vehicles are not in use, so as to prevent unauthorized use and theft of such recreational vehicles.

Another object of the present invention, while achieving the before stated objects, is to provide a trailer for transporting and storage of a plurality of multi-wheeled recreational vehicles which is easy to use, economical in construction, and which will readily allow one person to load and unload a plurality of such recreational vehicles.

Other objects, advantages and features of the present invention will become apparent upon reading of the following description as read in conjunction with the drawings and appended claims.

BRIEF DESCRIPTION OF THE DRAWINGS

FIG. 3 is a fragmentary, isometric view of a rearward portion of the trailer of FIG. 1 illustrating the support platform in a position substantially normally disposed to a horizontal plane of the lower frame assembly, and further illustrating an extension member connected to the support platform for abutting and supporting the rearward end of the upper frame assembly when the upper frame assembly is in the horizontally disposed first position.

FIG. 4 is a fragmentary, side elevational view of a rearward end of the upper frame assembly of the trailer of the present invention wherein the upper frame assembly is in the second angularly disposed position, and illustrating a ramp member for stabilizing the upper frame assembly with respect to the lower frame assembly as a vehicle is loaded onto and unloaded from the upper frame assembly.

FIG. 5 is a framentary, isometric view of a support member of the trailer of the present invention for pivotally connecting the upper frame assembly of the trailer to the lower frame assembly so that the upper frame assembly can be selectively moved between the substantially horizontally disposed first position and the angularly disposed second position.

FIG. 6 is a fragmentary, isometric view of an extension member connected to the rearward end of the lower frame assembly of the trailer of the present invention so that a second trailer can be connected thereto for towing.

DESCRIPTION

Figure 1:
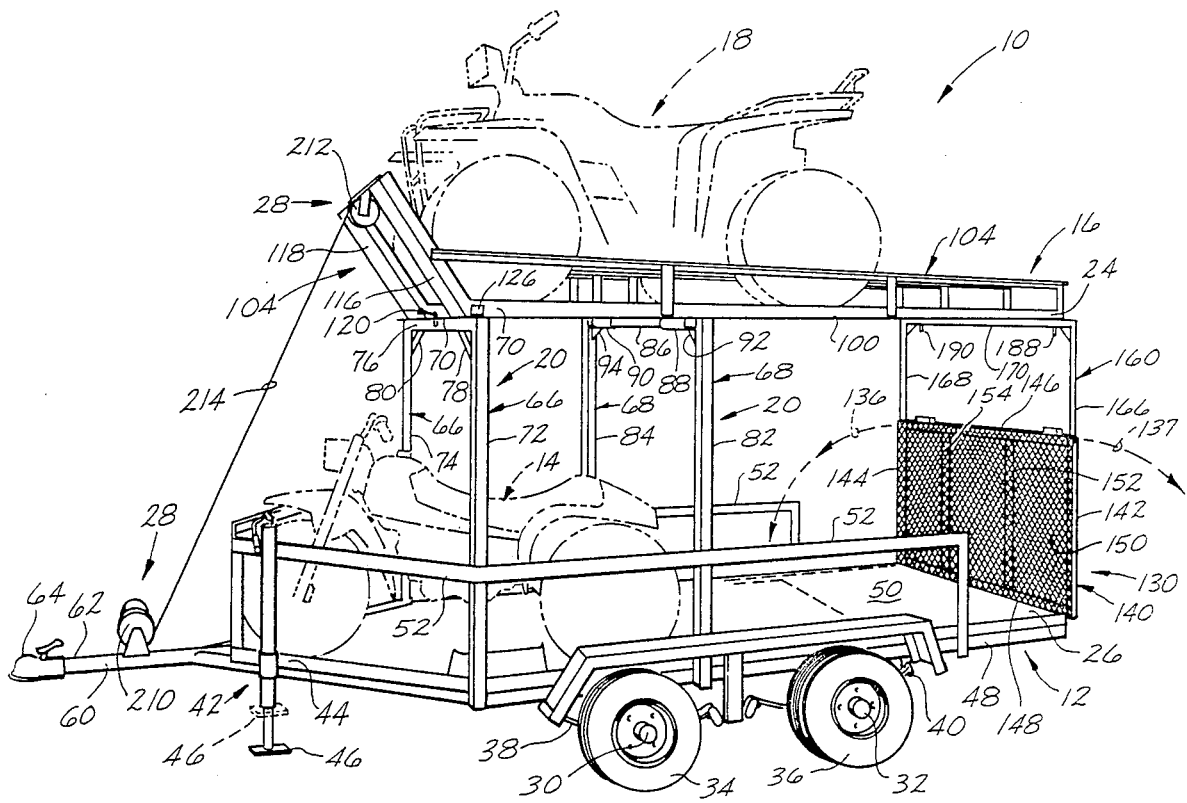
FIG. 1 is an isometric view of a trailer construction in accordance with the present invention, and illustrating, in phantom lines, a four-wheeled motorcycle-type recreational vehicle positioned and supported on an upper frame assembly of the trailer, and a three-wheeled motorcycle-type recreational vehicle positioned and supported on a lower frame assembly of the trailer.
Figure 2:
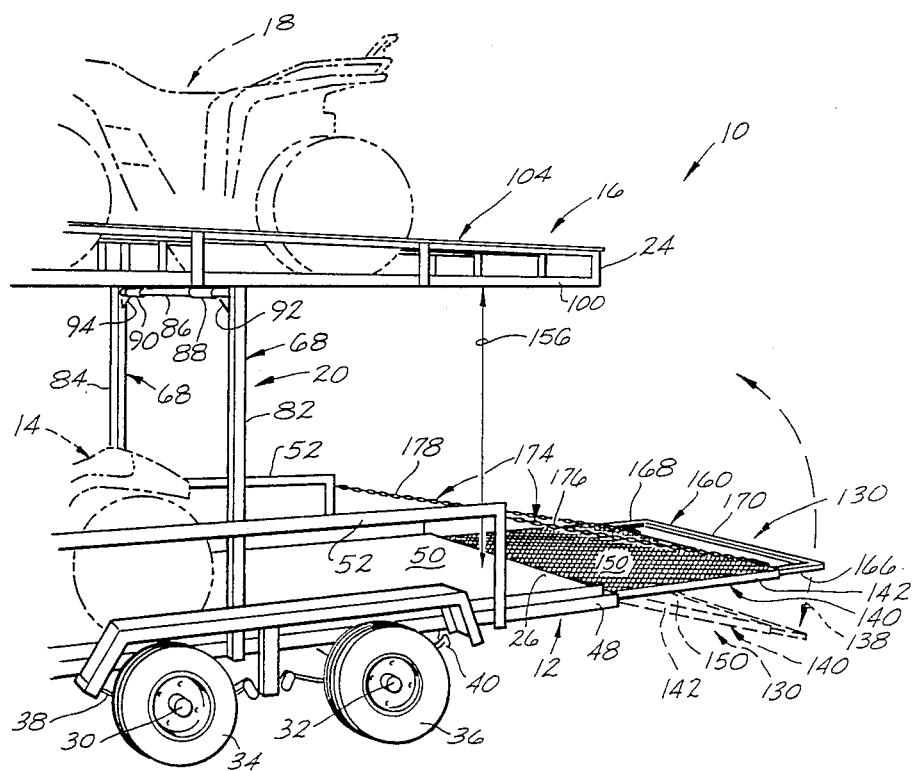
FIG. 2 is a fragmentary, isometric view of the trailer of FIG. 1 illustrating a support platform of the trailer in a position for extending the operational length of the lower frame assembly of the trailer, and illustrating, in phantom lines, the positioning of the support platform for the loading and unloading of vehicles onto or from one of the upper frame assembly and the lower frame assembly of the trailer.
Figure 9:
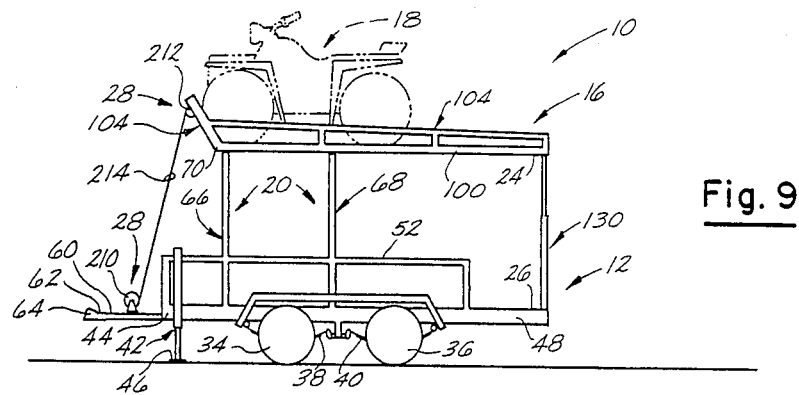
FIG. 9 is a schematic representation of the trailer of FIG. 1 wherein the upper frame assembly is stabilized in a substantially horizontally disposed first position above the lower frame assembly by the winch assembly and the support platform.
Figure 11:
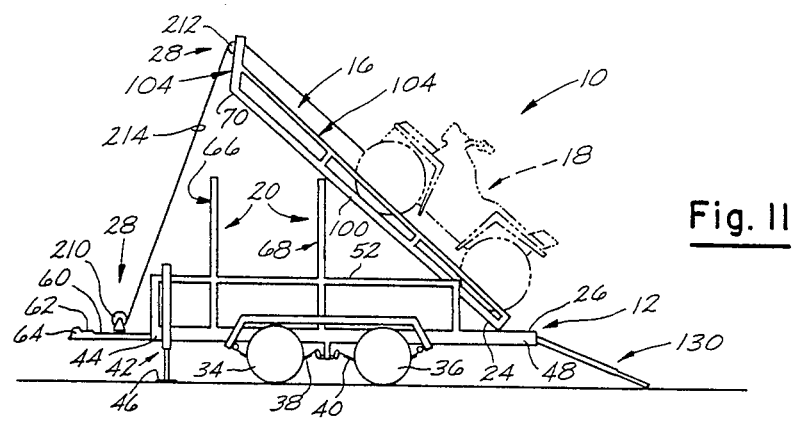
FIG. 11 a schematic representation of the trailer of FIG. 1 wherein the upper frame assembly has been moved to the angularly disposed second position, and the winch assembly has been activated for controllably releasing the vehicle to permit the vehicle to be unloaded from the trailer.
Figure 12:
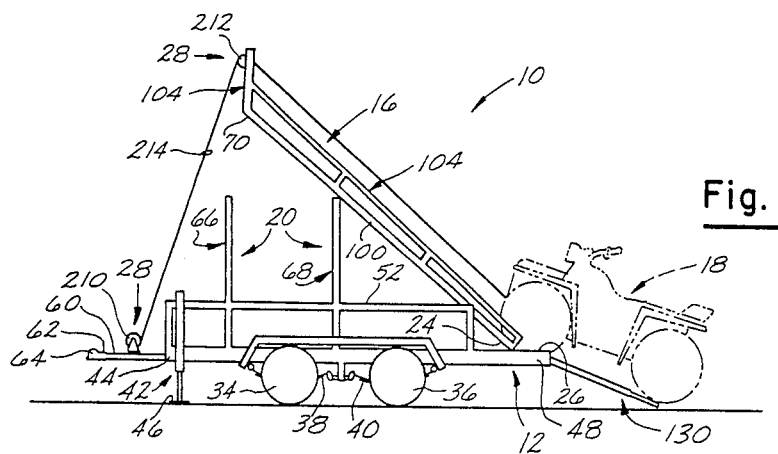
FIG. 12 is a schematic representation of the trailer of FIG. 1 wherein the vehicle is being controllably released by the winch assembly, and wherein the vehicle (shown in phantom lines) is positioned on the ramp member connected to the upper frame assembly for stabilizing the upper frame assembly in the angularly disposed second position as the vehicle is unloaded therefrom, and also illustrating a portion of the vehicle supported on the support platform.

Referring now to the drawings, and more specifically to FIG. 1, shown therein is a trailer 10 for transporting and storing a plurality of recreational vehicles, such as three and four-wheeled motorcycle-type recreational vehicles. The trailer 10 comprises a substantially horizontally disposed lower frame assembly 12 adapted to receive and support thereon at least one recreational vehicle 14, (such as a three-wheeled motorcycle illustrated by phantom lines), an upper frame assembly 16 adapted to receive and support thereon at least one recreational vehicle 18, (such as a four-wheeled motorcycle 18 illustrated by phantom lines), and a support assembly 20 connected to the lower frame assembly 12 for pivotally connecting the upper frame assembly 16 to the lower frame assembly 12 such that the upper assembly 16 is movable between a substantially horizontally disposed first position (as illustrated in FIGS. 1, 2 and 9) and an angularly disposed second position (as shown in FIGS. 11 and 12). When the upper frame assembly 16 is disposed in the substantially horizontally disposed first position, the upper frame assembly 16 is positioned a distance above the lower frame assembly 12 so that the vehicle 14, such as a three-wheeled motorcycle, can be selectively positioned on the lower frame assembly 12; and the upper frame assembly 16 is disposed substantially parallel to the lower frame assembly 12 and adapted to support the vehicle 18, such as a four-wheeled motorcycle thereon. On the other hand, when the upper frame assembly 16 is in the second position the upper frame assembly 16 is angularly disposed above the lower frame assembly 12 so that a rearward end 24 of the upper frame assembly 16 is positioned substantially adjacent the lower frame assembly 12 and in close proximity to a rearward end 26 of the lower frame assembly 12 substantially as shown in FIGS. 4, 11 and 12.

In order to load the recreational vehicle 18 (such as the four-wheeled motorcycle) onto the upper frame assembly 16 of the trailer 10, or to controllably unload the vehicle, (such as the four-wheeled motorcycle 18), from the upper frame assembly 16, as the upper frame assembly 16 pivots between the substantially horizontally disposed first position and the angularly disposed second position, the trailer 10 further comprises a winch assembly 28 mounted on the lower frame assembly 12 and operably connected to the upper frame assembly 16. The winch assembly 28 is connectable to the vehicle 18, such as the four-wheeled motorcycle (illustrated in phantom) for selectively moving the vehicle 18 to the loaded position on the upper frame assembly 16 (as shown in FIGS. 1 and 9) as the upper frame assembly 16 pivots between the angularly disposed second position and the substantially horizontally disposed first position; and for controllably releasing the vehicle 18 to permit the vehicle 18 to be unloaded from the upper frame assembly 16 as the upper frame assembly 16 pivots between the substantially horizontally disposed first position and the angularly disposed second position. Thus, the unique combination of the pivotal attachment of the upper frame assembly 16 to the lower frame assembly 12 via the support assembly 20, in combination with the winch assembly 28, readily permits one person to selectively load or unload the vehicle 18, such as the four-wheeled motorcycle, onto the upper frame assembly 16 of the trailer 10.

The trailer 10 further comprises transversely disposed tandem axles 30 and 32 connected to the lower frame assembly 12 by conventional means well known in the art. A plurality of wheel assemblies, such as wheel assemblies 34 and 36, are connected to one end of each of the axles 30, 32 and a plurality of wheel assemblies (not shown) are connected to the opposite ends of the axles 30 and 32. In order to provide suspension for the trailer 10, a conventional spring assembly, such as leaf springs 38 and 40, are connected to the wheel assemblies of the trailer, such as the wheel assemblies 34 and 36. The use of tandem axles, such as axles 30 and 32, the attachment of the wheel assemblies, such as wheel assemblies 34 and 36 to the axles, and the use of a suspension assembly such as leaf springs 38 and 40, are well known in the art of trailer construction. Thus, no further comments are deemed necessary to enable one to fully understand the inventive concept of the trailer 10 of the present invention.

In order to stabilize the trailer 10 when the trailer 10 is detached from a towing vehicle (not shown), a jack assembly 42 is connected to and supported by a forward end portion 44 of the lower frame assembly 12. The jack assembly 42 is of conventional construction and is provided with an extended mode (illustrated in FIGS. 1 and 9-12) and a retracted mode (illustrated by phantom lines in FIG. 1). In the extended mode a foot portion 46 of the jack assembly 42 engages a supporting surface, such as the ground, so as to maintain the trailer 10 in a stable, substantially horizontally disposed position; whereas in the retracted mode the foot portion 46 of the jack assembly 42 is retracted a sufficient distance above the ground so that the foot portion 46 does not engage or contact the surface over which the trailer 10 is being pulled. Jack assemblies utilized in stabilizing trailers, such as jack assembly 42, are well known in the art. Thus, no further description of the jack assembly 42 is believed necessary to enable one to fully understand the inventive concept of the trailer 10 of the present invention.

The lower frame assembly 12 of the trailer 10 comprises a frame 48 and a vehicle supporting floor 50. The frame 48 is connected to and supported by the tandem axles 30, 32 and the leaf springs 38, 40; and the vehicle supporting floor 50 is connected to and supported by the frame 48. The frame 48 is fabricated of a plurality of structural members which are connected so as to be disposed around the perimeter of the vehicle supporting floor 50. In order to strengthen the frame 48, and thus increase the load capacity of the lower frame assembly 12, a plurality of cross brace members can be positioned between and connected to oppositely disposed sides of the frame 48.

The lower frame assembly 12 further comprises a lower rail member 52 connected to and supported by the frame 48 such that the lower rail member extends upwardly from the frame 48 and along the forward end portion and at least a portion of the opposed sides of the frame 50 substantially as shown in FIGS. 1 and 9-12.

The lower frame assembly 12 further comprises a tongue member 60 connected to and supported by a forward portion of the frame 48 in a conventional manner such that the tongue member 60 extends outwardly therefrom substantially as shown. A distal end 62 of the tongue member 60 is provided with a hitch assembly 64 which is connectable to a ball member (not shown) mounted on a rear bumper of a towing vehicle.

The lower frame assembly 12 can be provided with any suitable configuration. However, when transporting three-wheeled vehicles, such as the vehicle 14, on the lower frame assembly 12 of the trailer 10, desirable results have been obtained wherein the forward end portion 44 of the lower frame assembly 12 is provided with a triangular shaped configuration and the remainder of the lower frame assembly 12 is substantially rectangular in configuration. That is, the lower frame assembly 12, and thus the vehicle supporting floor 50 thereof, are provided with a substantially pentagonal configuration as shown in FIG. 1. Thus, the configuration of the lower frame assembly 12, including the connection of the lower rail member 52 to the frame 48 thereof, permits more than one of the recreational vehicles, such as the three-wheeled motorcycle 14, to be supported on the vehicle supporting floor 50 and thus transported by the trailer 10.

Referring now to FIGS. 1, 2, 5 and 7, the support assembly 20 utilized to interconnect the lower frame assembly 12 and the upper frame assembly 16 of the trailer 10 will be described. It should be noted, however, that the support assembly 20 also serves to stabilize the lower rail member 52 of the lower frame assembly 12, that is, the lower rail member 52 is connected to the support assembly 20 substantially as shown.

The support assembly 20 comprises a first upright support member 66 and a substantially parallel, spatially disposed second upright member 68. The first upright support member 66 is connected to the lower frame assembly 12 so as to be disposed substantially adjacent a forward end portion 70 of the upper frame assembly 16 when the upper frame assembly 16 is in the substantially horizontally disposed first position. That is, in the configuration of the trailer 10 illustrated in FIG. 1, the first upright support member 66 is connected to the frame 48 and the lower rail member 52 of the lower frame assembly 12 at a position substantially corresponding to the junction between the triangular shaped portion constituting the forward end portion 44 of the lower frame assembly 12 and the substantially rectangular shaped portion constituting the remainder of the lower frame assembly 12.

The second upright support member 68, which as previously stated is disposed in a substantially parallel, spatial relationship with the first support member 66, is connected to the frame 48 and the lower rail member 52 of the lower frame assembly 12 at a position between the medial portion of the lower frame assembly 12 and the first upright member 66. Further, the second upright support member 68 is pivotally connected to the upper frame assembly 16 such that the upper frame assembly 16 is pivotally movable between the horizontally disposed first position and the angularly disposed second position. For reasons which will be discussed in more detail hereinafter, it is desirable that the second upright support member 68 be positioned on the lower frame assembly 12 such that the pivotal attachment of the second upright support member 68 to the upper frame assembly 16 is substantially below the center of gravity of the vehicle positioned on the upper frame assembly 16, such as the vehicle 18 indicated by phantom lines, when the upper frame assembly 16 is in the substantially horizontally disposed first position and the vehicle 18 is secured thereon.

Figures 7, 8:
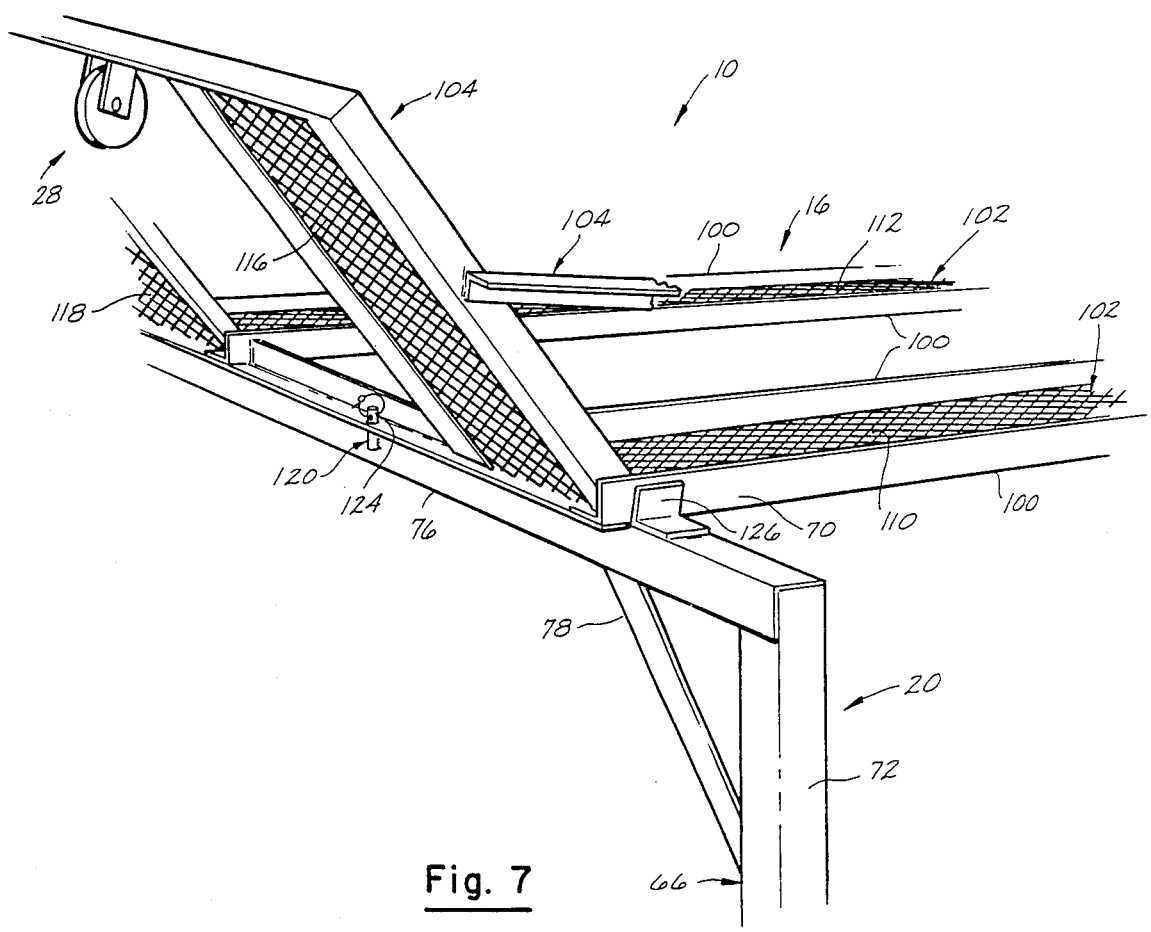
FIG. 7 is a fragmentary, isometric view of a forward end portion of the upper frame assembly of the trailer of the present invention, and illustrating the attachment of a pulley of the winch assembly to the upper frame assembly.
FIG. 8 is a fragmentary, isometric view of the rearward end portion of the upper frame assembly of the trailer of the present invention, and illustrating the ramp member employed to stabilize the upper frame assembly as a vehicle is loaded onto or unloaded from the upper frame assembly, the extension member of the support platform being disposed in an extended position and connected to the upper frame assembly for stabilizing and supporting the upper frame assembly when the upper frame assembly is in the substantially horizontally disposed first position.

As shown in FIGS. 1 and 7, the first upright support member 66 is an inverted, substantially U-shaped member having a first upwardly extending leg 72, a substantially parallel, spatially disposed second upwardly extending leg 74, and a bridging member 76 supported by and connected to the first and second upwardly extending legs 72, 74. Thus, the bridging member 76 of the first upright support member 66 abuttingly engages and supports the forward end portion 70 of the upper frame assembly 16 when the upper frame assembly 16 is in the substantially horizontally disposed first position. Because of the weight of the upper frame assembly 16, together with the weight of the vehicle positioned thereon, such as the vehicle 18, it may be desirable to reinforce the first upwardly extending leg 72 and the second upwardly extending leg 74 of the first upright support member 66 to the bridging member 76. Such can be accomplished using conventional techniques, such as by the connection of brace members 78 and 80 to the bridging member 76 and the first upwardly extending leg 72 and the second upwardly extending leg 74 of the first upright support member 66 substantially as shown.

As shown in FIGS. 1 and 2, the second upright support member 68 of the support assembly 20 is also an inverted, substantially U-shaped member having a first upwardly extending leg 82, a substantially parallel, spatially disposed second upwardly extending leg 84, and a bridging member 86 disposed between and connected to the first and second upwardly extending legs 82, 84. The bridging member 86 is pivotally connected to the upper frame assembly 16 of the trailer 10 such that the upper frame assembly 16 can be selectively moved between one of the substantially horizontally disposed first position and the angularly disposed second position. Any suitable means can be employed for pivotally connecting the upper frame assembly 16 to the bridging member 86 of the second upright support member 68. However, desirable results have been obtained wherein the bridging member 86 of the second upright member 68 is a tubular member and the pivotal attachment of the upper frame assembly 16 to the bridging member 86 of the second upright support member 68 is achieved via collar members 88, 90. As with the case of the first upright support member 66, it may be desirable to reinforce the second upright support member 68 because of the weight of the upper frame assembly 16 and the vehicle positioned thereon, together with the stress applied to the second upright support member 68 due to the pivotal movement of the upper frame assembly 16 between one of the substantially horizontally disposed first position and the angularly disposed second position. Any suitable means can be employed to reinforce the second upright support member 68, such as by securing brace members 92, 94 to the bridging member 86 and the first and second upwardly extending legs 82, 84 substantially as shown in the drawings.

While the pivotal attachment of the upper frame assembly 16 to the bridging member 86 of the second upright support member 68 has been shown via the collar members 88, 90 disposed over and thus enclosing at least a portion of the tubular member forming the bridging member 86, it should be understood that any means well known in the art suitable for pivotally connecting the upper frame assembly 16 to the bridging member 86 of the second upright support member 68 can be employed as long as such pivotal attachment permits the upper frame assembly 16 to be selectively moved between one of the substantially horizontally disposed first position and the angularly disposed second position.

The upper frame assembly 16, which is disposed above and substantially parallel to the lower frame assembly 12 of the trailer 10 when the upper frame assembly 16 is in the substantially horizontally disposed first position, comprises a frame 100 and a vehicle supporting floor 102. The frame 100 is pivotally connected to the bridging member 86 of the second upright support member 68 via the collar members 88, 90. That is, the collar members 88, 90 are connected to and supported by the frame 100 such that the collar members 88, 90 are disposed over and pivotally connected to the adjacent portion of the bridging member 86 of the second upright support member 68. The vehicle supporting floor 102 is connected to and supported by the frame 100.

The frame 100 is fabricated of a plurality of structural members which are connected so as to be disposed around the perimeter of the vehicle supporting floor 102. In order to strengthen the frame 100, and thus increase the load capacity of the upper frame assembly 16, a plurality of cross brace members can be positioned between and connected to oppositely disposed sides of the frame 100.

The upper frame assembly 16 further comprises an upper rail member 104 connected to and supported by the frame 100 such that the upper rail member 104 extends upwardly from the frame 100 and along the forward end portion and the opposed sides of the frame 100, and thus the vehicle supporting floor 102 substantially as shown.

As shown in the drawing, the upper rail member 104 supported by and extending along the forward end portion of the frame 100 of the upper frame assembly 16 is desirably provided with a height greater than the height of the upper rail member 104 supported by and extending along the opposed sides of the upper frame assembly 16. Further, the upper rail member 104 supported by and extending along the forward end portion of the frame 100 of the upper frame assembly 16 is desirably angularly disposed in a forward direction with relation to the vehicle supporting floor 102 so that wheels of the vehicle being transported on the upper frame assembly 16 of the trailer 10, such as the vehicle 18, can be disposed against and supported by the portion of the upper rail member 104 extending along the forward end of the frame 100 of the upper frame assembly 16. That is, the height of the upper rail member 104 supported by and extending along the forward end portion of the frame 100 of the upper frame assembly 16 is not only angularly disposed as illustrated, but is provided with a height substantially equal to the height of the wheels of the vehicle positioned on the vehicle supporting floor 102. Thus, the vehicle, such as the four-wheeled motorcycle 18, can be stabilized on the vehicle supporting floor 102 by abutting the wheels of the vehicle against the upper rail member 104 disposed along the forward end portion of the frame assembly 16 and securing same in place via the winch assembly 28.

The vehicle supporting floor 102 of the upper frame assembly 16 can be fabricated as a continuous unit similar to the vehicle supporting floor 50 of the lower frame assembly 12; or, when a four-wheeled recreational vehicle is to be transported and stored on the vehicle supporting floor 102 of the upper frame assembly 16, the vehicle supporting floor 102 can be fabricated so as to comprise an elongated first upper floor section 110 extending the length of the upper frame assembly 16, and substantially parallel, spatially disposed elongated second upper floor section 112 extending the length of the upper frame assembly 16. In such instance, the first and second upper floor sections 110, 112 are constructed so as to receive and support thereon the wheels of the four-wheeled vehicle, such as the vehicle 18. When constructing the vehicle supporting floor 102 of sections, such as the first and second sections 110, 112, a second upper rail member 114 is connected to and supported by the frame 100 such that the second upper rail member 114 is disposed substantially adjacent interiorly disposed sides of the first and second upper floor sections 110, 112 of the vehicle supporting floor 102 substantially as shown in FIGS. 5 and 8. It should further be noted that when employing the first and second upper floor sections 110, 112 to form the vehicle supporting floor 102 of the upper frame assembly 16, the portion of the upper rail member 104 supported by and extending along the forward end portion of the frame 100 of the upper frame assembly 16 is provided with a first angularly disposed member 116 aligned with the first upper floor section 110 of the vehicle supporting floor 102, and a second angularly disposed member 118 aligned with the second upper floor section 112 of the vehicle supporting floor 102, substantially as shown in FIG. 7.

In order to secure and stabilize the upper frame assembly 16 to the lower frame assembly 12 of the trailer 10 (when the upper frame assembly 16 is in the substantially horizontally disposed first position and abuttingly engaging the first upright support member 66 of the support assembly 20), the trailer 10 further comprises a lock device 120. The lock device 120 is utilized to connect the forward end portion of the upper frame assembly 16 to the bridging member 76 of the first upright support member 66. Any suitable means which can be utilized to securely connect the forward end portion of the upper frame assembly 16 to the bridging member 76 of the first upright support member 76 can be employed as the lock device 120. For example, as shown more clearly in FIG. 7, an aperture can be provided in the forward portion of the frame 100 of the upper frame assembly 16 and an aperture can be provided within the bridging member 76 of the first upright support member 66 of the support assembly 20. The apertures, which are aligned when the upper frame assembly 16 is in the substantially horizontally disposed first position, are adapted to receive a pin element 124. Thus, when the pin element 124 is inserted into the aligned apertures, the upper frame assembly 16 is connected to the lower frame assembly 12 in a locked condition. It should be understood that the use of the pin element 124 as the lock device 120 to secure the upper frame assembly 16 to the lower frame assembly 12 is illustrative only, and that any suitable means capable of securing the upper frame assembly 16 to the lower frame assembly 12 in a locked condition can be employed.

· In order to provide lateral stability to the upper frame assembly 16 when same is in the substantially horizontally disposed first position, and to insure proper alignment of the upper frame assembly 16 on the bridging member 76 of the first upright support member 66 of the support assembly 20, a pair of guide members (only one guide member 126 being shown in FIGS. 1 and 7) are connected to and supported by the bridging member 76 of the first upright support member 66. The guide members, such as guide member 126, flange outwardly and are disposed substantially adjacent the frame 100 of the upper frame assembly 16 when the upper frame assembly 16 is in the substantially horizontally disposed first position.

Referring now to FIGS. 1-3, the trailer 10 further comprises a support platform 130. The support platform 130 is connected to the rearward end 26 of the lower frame assembly 12 via hinge assemblies 132, 134 such that the support platform 130 is selectively movable between a first position, a plurality of intermediate second positions, and a third position. In the first position, the support platform 130 is selectively moved in the direction indicated by the arrow 136 in FIG. 1, so that the support platform is disposed adjacent the vehicle supporting floor 50 of the lower frame assembly 12. In the first intermediate position, indicated in FIG. 1, the support platform 130 is disposed substantially normal to the horizontal plane of the lower frame assembly 12 and the upper frame assembly 16 when the upper frame assembly 16 is in the substantially horizontally disposed first position; whereas, in the second intermediate position (as illustrated in FIG. 2) the support platform 130 is moved in the direction of the arrow 137 so as to extend outwardly from the rearward end 26 of the lower frame assembly 12 such that the support platform 130 and the lower frame assembly 12 are substantially aligned. In the third position (indicated by phantom lines in FIG. 2), the support platform 130 is moved in the direction indicated by the arrow 138 so that the support platform 130 extends outwardly from the rearward end 26 of the lower frame assembly 12 in a downwardly extending direction and provides a supporting surface for a vehicle, such as vehicle 14, to be loaded or unloaded from one of the lower frame assembly 12 and the upper frame assembly 16. Thus, the support platform 130 serves a multitude of functions, namely, as a support element for supporting the rearward end 26 of the upper frame assembly 16 when the upper frame assembly 16 is disposed in the substantially horizontally disposed first position, as an extension member for lengthening the effective length of the trailer 10, and as a support ramp for providing a supporting surface for the loading and unloading vehicles on one of the lower frame assembly 12 and the upper frame assembly 16.

The construction of the support platform 130 can vary widely provided that the construction permits the support platform 130 to be selectively positioned in one of the first position, the intermediate second positions, and the third position. However, desirable results have been obtained wherein the support platform 130 comprises a frame 140 having a first side member 142, a substantially parallel, spatially disposed second side member 144, an upper cross brace member 146 and a lower cross brace member 148. The upper cross brace member 146 extends between and is connected to an upper end of the first side member 142 and an upper end of the second side member 144 so as to be disposed substantially adjacent the upper ends thereof; and the lower cross brace member 148 is positioned to extend between and connected to a lower end of the first side member 142 and a lower end of the second side member 144 so as to be substantially adjacent the lower ends thereof, and substantially parallel to the upper cross brace member 146. A platform floor 150 is positioned on and connected to the first side member 142, the second side member 144, the upper cross brace 146 and the lower cross brace 148 of the frame 140 so as to provide a surface over which a vehicle can travel during loading and unloading of the vehicle onto and from one of the lower frame assembly 12 and the upper frame assembly 16 of the trailer 10. If desired, additional support members can be disposed between one of the first and second side members 142, 144 or the upper and lower cross brace members 146, 148 (such as internal brace members 152, 154) in order to provide additional strength to the platform floor 150. It should be noted, however, that in order for the support platform 130 to be positioned in the first position, that is, disposed on and supported by the vehicle supporting floor 50 of the lower frame assembly 12, the width of the support platform 130 must be no greater than the width of the vehicle supporting floor 50.

In order to permit the support platform 130 to be readily moved between any of the first position, the intermediate second positions, and the third position, it is necessary that the height of the support platform 130 be less than a distance 156 between the rearward end 26 of the lower frame assembly 12 and the rearward end 24 of the upper frame assembly 16 when the upper frame assembly 16 is in the substantially horizontally disposed first position. Thus, in order to utilize the support platform 130 in stabilizing the upper frame assembly 16 by abutment of the support platform 130 with the rearward end 24 of the upper frame assembly 16, the support platform 130 further comprises an extension member 160 slideably connectable to the first and second side members 142, 144 of the frame 140 of the support platform 130 so that the extension member 160 can be selectively moved between an extended position (as illustrated in FIG. 1) and a retracted position (substantially as shown in FIG. 2) which will be more fully described hereinafter.

When the support platform 130 is disposed in an intermediate position substantially normal to the lower frame assembly 12 and the upper frame assembly 16, and the extension member 160 is in the extended position and disposed substantially adjacent the rearward end 24 of the upper frame assembly 16, the extension member 160 can be connected to the upper frame assembly 16 by any suitable means. On the other hand, when the extension member 160 is in the retracted position, the extension member 160 is disposed in close proximity to the upper cross brace 146 of the frame 140 of the support platform 130. Thus, the extension member 160 is in the retracted position when the support platform 130 is disposed in one of the first position, an intermediate second position as illustrated in FIG. 2, and in the third position for loading or unloading a vehicle from one of the lower frame assembly 12 and the upper frame assembly 16.

While any suitable means can be utilized for connecting the extension member 160 to the first and second side members 142, 144 of the frame 140 of the support platform 130, desirable results have been obtained wherein the extension member 160 is an inverted, substantially U-shaped member having a downwardly extending first leg 166, a downwardly extending second leg 168 and a substantially horizontally disposed bridging member 170 connected to the first and second legs 166, 168 as illustrated. In such instance, the first and second side members 142, 144 of the frame 140 of the support platform 130 are desirably tubular members. Thus, the first side member 142 telescopically receives the first downwardly extending leg 166 of the extension member 160; and the second side member 144 telescopically receives the second downwardly extending leg 168 of the extension member 160.

Any suitable means can be employed to stabilize the first and second downwardly extending legs 166, 168 of the extension member 160 in a desired position with the first and second side members 142, 144 of the support platform 130. For example, the first and second side members 142, 144 of the support platform 130 can each be provided with a bushing in the upper end portion thereof, such as a bushing 172 (see FIG. 3) positioned within the upper end portion of the first side member 142 of the support platform 130, and a bushing (not shown) similarly positioned in the upper end portion of the second side member 144. The bushing members, such as bushing member 172, permit the first and second downwardly extending legs 166, 168 of the extension member 160 to be slideably positioned in the first and second side members 142, 144 of the support platform 130 so as to position the extension member 160 in the desired extended position or retracted position, while stabilizing the extension member 160 with respect to the support platform 130 in the desired position. Thus, the positioning of the extension member 160 with respect to the support platform 130 will be dependent, to a large degree, upon whether the support platform 130 is disposed in the first position, one of the second intermediate positions, or the third position as heretofore described.

In order to secure the support platform 130 in the intermediate position wherein the support platform 130 is disposed substantially normal to the longitudinal plane of the lower frame assembly 12 and the upper frame assembly 16 (such as during transportation of vehicles on the trailer 10, or to prevent unauthorized removal of vehicles from the trailer 10 when the trailer 10 is employed to store such vehicles), the bridging member 170 of extension member 160 is desirably provided with a plurality of apertures 180, 182. The apertures 180, 182 are alignable with apertures 184, 186 (see FIG. 8) in the rearward end 24 of the upper frame assembly 16 when the support platform 130 and extension member 160 are disposed in the position illustrated in FIGS. 1 and 8. Thus, connecting elements, such as pin elements 188, 190, or locking devices, if desired, can be positioned through the aligned apertures 180, 182 in the bridging member 170 and the apertures 184, 186 in the upper frame assembly 16 for securing the extension member 160 to the rearward end 24 of the upper frame assembly 16. The interconnection of the lower frame assembly 12 to the upper frame assembly 16 via the extension member 160 and the support platform 130 not only provides a means for supporting the upper frame assembly 16, but also provides a means for preventing unauthorized removal of a vehicle from one of the lower frame assembly 12 and the upper frame assembly 16.

As previously stated, the support platform 130 is stabilized in the first position by the vehicle supporting floor 50 of the frame 100 of the lower frame assembly 12; and the support platform 130 is secured in the second intermediate position wherein the support platform 130 is disposed substantially normal to the longitudinal planes of the lower frame assembly 12 and the upper frame assembly 16 by attachment of the extension member 160 of the support platform 130 to the rearward end 24 of the upper frame assembly 16 with the pin elements 188, 190. In order to stabilize the support platform 130 in the second intermediate position wherein the support platform 130 extends outwardly from the rearward end 26 of the lower frame assembly 12 substantially as shown in FIG. 2 (or in any position between the intermediate position of the support platform 130 illustrated in FIGS. 1 and 9, and the third position of the suport platform 130 illustrated in FIGS. 10–12 and by phantom lines in FIG. 2), the trailer 10 further comprises a connector assembly 174 for connecting the support platform 130 to the rail member 52 of the lower frame assembly 12 and thereby stabilizes the support platform 130 in the desired position. Any suitable means can be employed as the connector assembly 174. However, desirable results have been obtained wherein the connector assembly 174 comprises a pair of chain members 176, 178. When employing chain members 176, 178 as the connector assembly 174, one end of the chain member 176 is connectable to the rearward end portion of the rail member 52 substantially aligned with the first side member 142 of the frame 140 of the support platform 130; and one end of the chain member 178 is connectable to the rearward end portion of the rail member 52 substantially aligned with the second side member 144 of the frame 140 of the support platform 130. The second end of the chain member 176 is then connectable to the support platform 130, such as by the positioning of the second end of the chain member 176 through a tubular element 177 (see FIG. 3) secured to and supported by the upper cross brace member 146 of the frame 140, and thereafter connecting the chain such that the effective length of the chain member 176 is that required to secure the support platform 130 in the desired intermediate second position. Similarly, the second end of the chain member 178 is connectable to the support platform 130, such as by the positioning of the second end of the chain member 178 through a tubular element 179 (see FIG. 3) secured to and supported by the upper cross brace member 146 of the frame 140, and thereafter connecting the chain such that the effective length of the chain member 178 substantially corresponds to the effective chain length of the chain member 176 so as to secure and stabilize the support platform 130 in the desired intermediate second position.

In order to stabilize the rearward end 24 of the upper frame assembly 16 with relation to the lower frame assembly 12 (when the upper frame assembly 16 is in the angularly disposed second position and a vehicle, such as vehicle 18, is loaded onto or unloaded from the upper frame assembly 16) the trailer 10 further comprises a ramp assembly 200 pivotally connected to the rearward end 24 of the upper frame assembly 16. The ramp assembly 200 is movable between a stored first position (as shown in FIG. 8) and an extended second position (as shown in FIG. 4). In the stored first position the ramp assembly 200 is disposed substantially adjacent and supported by the vehicle supporting floor 102 of the upper frame assembly 16; and in the extended second position the ramp assembly 200 extends outwardly from the rearward end 24 of the upper frame assembly 16 and is disposed substantially adjacent a portion of the vehicle supporting floor 52 of the lower frame assembly 12 in close proximity to the rearward end 26 of the lower frame assembly 12. Thus, when the ramp assembly 200 is in the extended second position, and the upper frame assembly 16 is in the angularly disposed second position, the ramp assembly 200 supportingly engages the rear wheels of the vehicle being loaded onto or unloaded from the upper frame assembly 16, such as the vehicle 18, so that the upper frame assembly 16 is stabilized until such time as the rear wheels of the vehicle 18 are positioned on the upper frame assembly 16, (as during the loading procedure) or the front wheels of the vehicle 18 are removed from the upper frame assembly 16, such as during the unloading procedure. Thus, the ramp assembly 200 insures stability of the upper frame assembly 16 both during the loading and unloading of a vehicle onto or from the upper frame assembly 16 of the trailer 10.

The construction and pivotal attachment of the ramp assembly 200 to the rearward end 24 of the upper frame assembly 16 can vary widely and will be dependent upon the construction and design of the vehicle supporting floor 102 of the upper frame assembly 16. For example, when the vehicle supporting floor 102 is constructed of substantially parallel disposed floor sections, (such as the first upper floor section 110 and the second upper floor section 112 as illustrated and heretofore described with reference to FIGS. 5, 7 and 8), the ramp assembly 200 comprises a first ramp member 202 and a second ramp member 204. The first ramp member 202 is pivotally connected to the rearward end of the first upper floor section 110 of the vehicle supporting floor 102 by any suitable means, such as hinge 206; and the second ramp member 204 is pivotally connected to the rearward end of the second upper floor section 112 of the vehicle supporting floor 102 by any suitable means, such as hinge 208, substantially as shown in FIG. 8.

As previously indicated, both during the loading and unloading of a vehicle onto and from the upper frame assembly 16 of the trailer 10, the winch assembly 28 is employed for a variety of purposes, namely, for controllably loading the vehicle onto the upper frame assembly 16, positioning the vehicle on the upper frame assembly 16 while selectively moving the upper frame assembly 16 to the substantially horizontally disposed first position, and for controllably releasing the vehicle to permit the upper frame assembly 16 to pivot between the substantially horizontally disposed first position and the angularly disposed second position so that the vehicle can be unloaded from the upper frame assembly 16.

Referring now to FIGS. 1 and 9 - 12, the winch assembly 28 comprises a winch 210 mounted on the tongue 60 of the lower frame assembly 12, a pulley 212 mounted on the forward end portion 70 of the upper frame assembly 16 so as to be aligned with a substantially centrally disposed axis of the upper frame assembly 16, and a winch line 214. One end of the winch line 214 is connected to the winch 210 and the other end of the winch line 214 is connectable to a vehicle, such as the vehicle 18, for selectively loading and unloading the vehicle 18 onto and from the upper frame assembly 16 of the trailer 10. Thus, the winch 210 is provided with a reel-in mode for loading the vehicle onto the upper frame assembly 16 of the trailer 10, and for securing the vehicle thereon during transportation and storage of the vehicle, and a reel-out mode for controllably releasing the vehicle so that the upper frame assembly 16 can be selectively pivoted to the angularly disposed second position and the vehicle unloaded therefrom in a controlled manner by the winch 210 and the winch line 214. Thus, it is apparent that the pulley 212 should be mounted on the forward end portion 70 of the upper frame assembly 16 so that the pulley 212 is aligned with the winch 210 to prevent binding of the winch line 214 during operation of the winch 210 for loading and unloading the vehicle from the upper frame assembly 16 of the trailer 10.

Many times it is desirable to pull more than one trailer vehicle behind a towing vehicle, that is, to utilize the piggy-back concept of pulling more than one type of trailer supporting a recreational vehicle. Referring now to FIG. 6, the trailer 10 further comprises a housing 220 connected to the lower frame assembly 12 so as to be substantially centrally disposed and adjacent the rearward end 26 of the lower frame assembly 12 substantially as shown. An extension member or tongue 222 is slideably disposed within the housing 220 and is selectively movable between a retracted first position and an extended second position. In the retracted first position the extension member 222 is disposed within the housing 220 and secured thereto by any suitable means, such as providing a plurality of apertures 224 in the housing 220 which are alignable with apertures, such as aperture 226, in the extension member 222 when the extension member 222 is retracted within the housing 220, and secured therein by any suitable means, such as a pin element 228. Similarly, when it is desired to position the extension member 222 in the extended position, the pin element 228 is removed, the extension member 222 slideably moved a selected distance to extend outwardly from the housing 220, and thereafter secured at the selected position by positioning the pin element 228 in the aligned apertures 224, 226 in the housing 220 and the extension member 222. The distal end 230 of the extension member 222 is provided with suitable means, such as aperture 232, so that a hitch can be secured to the distal end 230 of the extension member 222 for attachment of a second trailer (not shown) to the trailer 10.

Figure 10:
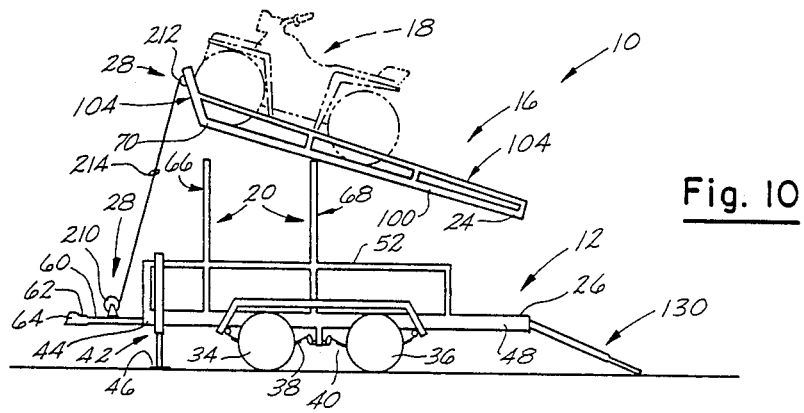
FIG. 10 is a schematic representation of the trailer of FIG. 1 wherein the extension member of the support platform has been disconnected from the upper frame assembly and lowered to a position for permitting the recreational vehicle (shown in phantom lines) on the upper frame assembly to be unloaded from the trailer.

Referring now to FIGS. 9-12, the procedure for unloading a vehicle from the upper frame assembly 16, such as the vehicle 18, will be described. As shown in FIG. 9, the winch line 214 of the winch assembly 28 is in a taut condition for securing the vehicle 18 in a stable position on the upper frame assembly 16. In unloading the vehicle 18 from the upper frame assembly 16, the extension member 160 of the support platform 130 is disconnected from the rearward end 24 of the upper frame assembly 16, the extension member 160 is then moved to the retracted position, and the support platform 130 is moved to the third position as illustrated in FIGS. 10-12. Thereafter, the winch 210 of the winch assembly 28 is activated to its reel-out mode and the tension on the winch line 214 is removed. Upon removal of the tension on the winch line 214 an upwardly directed force can be applied to the forward end portion 70 of the upper frame assembly 16 which will allow the upper frame assembly 16 to commence movement in the direction of the angularly disposed second position. As the upper frame assembly 16 commences pivoting to the angularly disposed second position, the tension on the winch line 214 secures the vehicle, such as the vehicle 18, so that the vehicle 18 is controllably released as the upper frame assembly 16 pivots to the angularly disposed second position in response to the winch 210, thus permitting the controlled movement of the vehicle 18 downwardly along the upper frame assembly 16.

As the vehicle 18 approaches the lower frame assembly 12, the rearward wheels of the vehicle 18 first engage the ramp assembly 200 so as to stabilize the upper frame assembly 16 with relation to the lower frame assembly 12; and continued movement of the vehicle 18 downwardly along the upper frame assembly 16 via the winch 210 and the winch line 214 permits the forward wheels of the vehicle 18 to engage the ramp assembly 200 such that the upper frame assembly 16 is stabilized again with relation to the lower frame assembly 12. The continued release of the winch line 214 (that is, as the winch line 214 is reeled-out by activation of the winch 210 of the winch assembly 28), permits the vehicle 18 to travel over the support platform 130 and be disposed on the ground. Thus, the vehicle 18 has been controllably released from the stored transporting position on the upper frame assembly 16. It should be noted that the winch assembly 28 allows one to controllably unload a vehicle, such as the vehicle 18, from the upper frame assembly 16. However, as is evident to those skilled in the art, for the vehicle to be unloaded from the upper frame assembly 16, the vehicle must be positioned in a neutral position to permit the vehicle to free-wheel and travel only in response to the operational mode of the winch assembly 28.

In loading a vehicle onto the upper frame assembly 16 of the trailer 10 the reverse sequence is employed. Thus, it is readily apparent that one person can readily load and unload recreational vehicles, such as three and four-wheeled motorcycle-type vehicles onto the upper frame assembly 16 of the trailer 10. It should further be noted, that in the loading and unloading of a recreational vehicle onto the lower frame assembly 12, the vehicle can be selectively driven onto or from the lower frame assembly 12 via the support platform 130.

It is clear that the present invention is well adapted to carry out the objects and attain the ends and advantages mentioned herein as well as those inherent in the invention. While presently preferred embodiments of the invention have been described for the purposes of this disclosure, numerous changes may be made which will readily suggest themselves to those skilled in the art and which are accomplished within the spirit of the invention disclosed and as defined in the appended claims.

What is claimed is:

1. A trailer for transporting and storing vehicles comprising:

lower frame assembly means substantially horizontally disposed for receiving at least one of the vehicles thereon, the lower frame assembly means having a forward end portion, and a rearward end;

wheel means rotatably connected to the lower frame means for supporting the lower frame means and for providing traveling movement thereto;

upper frame means for receiving at least one of the vehicles thereon, the upper frame means having a forward end and a rearward end;

support means for pivotally connecting the upper frame means to the lower frame means such that the upper frame means is moveable between a substantially horizontally disposed first position and an angularly disposed second position, in the substantially horizontally disposed first position the upper frame means being disposed a distance above the lower frame means so as to be in a substantially parallel relationship therewith, in the angularly disposed second position the upper frame means being angularly disposed above the lower frame means such that the rearward end of the upper frame means is positioned substantially adjacent the lower frame means and in close proximity to the rearward end of the lower frame means;

winch means supported by the lower frame means and connectable to one of the vehicles for selectively moving the vehicle to a loaded position on the upper frame means as the upper frame means pivots between the angularly disposed second position and the substantially horizontally disposed first position, and for controllably releasing the vehicle to permit the vehicle to move to an unloaded position as the upper frame means pivots between the substantially horizontally disposed first position and the angularly disposed second position;

lock means for securing the upper frame means to the support means when the upper frame means is in the substantially horizontally disposed first position; and a support platform pivotally connected to the rearward end of the lower frame means, the support platform selectively moveable between a first position, a plurality of intermediate second positions, and a third position, in the first position the support platform being disposed substantially adjacent and supported by the lower frame means, in one of the second intermediate positions the support platform being disposed substantially normal to the lower frame means and the upper frame means and supportingly engaging the rearward end of the upper frame means, in another of the second intermediate positions the support platform extending outwardly from the rearward end of the lower frame means such that the support platform and the lower frame means are substantially aligned, and in the third position the support platform extending outwardly from the rearward end of the lower frame means and in a downwardly extending direction so as to provide a supporting surface for the vehicle as the vehicle is loaded onto and unloaded from one of the lower frame means and the upper frame means.

2. The trailer of claim 1 further comprising:
first connector means for connecting the support platform to the upper frame means when the support platform is in the second intermediate position and disposed substantially normal to the lower and upper support frame means.

3. The trailer of claim 2 further comprising:
second connector means extendable between the lower frame means and the support platform for securing the support platform in the second intermediate position wherein the support platform extends outwardly from the lower frame means.

4. The trailer of claim 2 wherein the lower frame means is provided with a tongue member extending outwardly from the forward end portion of the lower frame means, a distal end of the tongue member connectable to a vehicle for towing the trailer, and wherein said winch means comprises:
a winch mounted on the tongue member, said winch having a reel-in mode and a reel-out mode;
a pulley mounted on the forward end of the upper frame means so as to be alignable with the winch; and,
a winch line disposable over the pulley, said winch line having a first end and an opposed second end, the first end of the winch line connected to the winch, the second end of the winch line connectable to one of the vehicles when the vehicle is in a position aligned with and substantially adjacent the support platform for loading said vehicle onto the upper frame means and for securing the vehicle thereon, and for controllably releasing said vehicle to unload the vehicle from the upper frame means when the upper frame means is moved to the angularly disposed second position.

5. The trailer of claim 4 further comprising ramp means pivotally connected to the rearward end of the lower frame assembly means for stabilizing the upper frame means with relation to the lower frame means when the upper frame means is in the angularly disposed second position and said vehicle is moved onto and from the upper frame means, said ramp means moveable between a stored first position and an extended second position, in the stored first position the ramp means being disposed substantially adjacent and supported by the upper frame means, in the extended second position the ramp means extending outwardly from the rearward end of the upper frame means and disposed adjacent the lower frame means when the upper frame means is in the angularly disposed second position.

6. The trailer of claim 5 wherein the support means comprises:

a first upright support assembly connected to the lower frame means in close proximity to the forward end portion thereof;
a second upright support assembly connected to the lower frame means at a position between a medial portion of the lower frame means and the first upright support assembly so as to be disposed substantially parallel to the first upright support assembly; and,
pivot means for pivotally connecting the upper frame means to the second support assembly so as to provide selective movement of the upper frame means between one of the first position and the second position.

7. The trailer of claim 6 wherein the second upright assembly is positioned and pivotally connected to the upper frame means via the pivot means at a position substantially below the center of gravity of the vehicle positioned on the upper frame means when the upper frame means is in the angularly disposed second position.

8. The trailer of claim 6 wherein the lower frame means comprises:
a lower frame;
a vehicle supporting floor connected to and supported by the lower frame; and,
a lower rail member connected to and supported by the lower frame and the first and second upright support assemblies, said lower rail member extending along a forward end portion and at least a portion of opposed sides of the lower frame.

9. The trailer of claim 8 wherein the upper frame means comprises:
an upper frame;
a vehicle supporting floor member connected to and supported by the upper frame; and,
an upper rail member connected to and supported by the upper frame such that the upper rail member extends along a forward end portion and opposed sides of the upper frame.

10. The trailer of claim 9 wherein the upper rail member extending along the forward end portion of the upper frame is provided with a height greater than the height of the upper rail member extending along the sides of the upper frame.

11. The trailer of claim 10 wherein the upper rail member extending along the forward end portion of the upper frame is angularly disposed in a forward direction with relation to the vehicle supporting floor member, and the angularly disposed portion of the upper rail member is provided with a height substantially equal to the height of wheels of the vehicle positioned on the vehicle supporting floor member.

12. The trailer of claim 11 wherein the vehicle supported by the vehicle supporting floor member of the upper frame means is a four-wheeled vehicle and the vehicle supporting floor member comprises:
an elongated first floor section extending the length of the upper frame; and,
a substantially parallel, spatially disposed elongated second section extending the length of the upper frame, the first and second floor sections adapted to receive and support thereon the wheels of the vehicle.

13. The trailer of claim 12 further comprising:
a second rail member connected to and supported by the upper frame means so as to be disposed substantially adjacent interiorly disposed sides of the first and second sections of the vehicle supporting member.

14. The trailer of claim 13 wherein the upper rail member extending along the forward end portion of the upper frame comprises:
   a first angularly disposed member connected to and supported by the upper frame means so as to be aligned with the first floor section; and,
   a second angularly disposed member connected to and supported by the upper frame means so as to be aligned with the second floor section.

15. The trailer of claim 14 wherein the support platform comprises:
   a frame having a first side member, a substantially parallel, spatially disposed second side member, an upper cross brace member and a lower cross brace member, the upper cross brace member extending between and connected to the first and second side member so as to be disposed substantially adjacent an upper end of said first and second side members, the lower cross brace member extending between and connected to the first and second side member so as to be disposed substantially adjacent a lower end of said first and second side members; and,
   a platform floor member connected to and supported by the frame.

16. The trailer of claim 15 wherein the support platform further comprises:
   an extension member supported by the first and second side member of the frame, said extension member moveable between an extended position and a retracted position, in the extended position the extension member being positionable substantially adjacent the rearward end of the upper frame member and connectable thereto via the first connector means when the support platform is in a second intermediate position so as to be substantially normal to the lower frame member and the upper frame member is in the first position, in the retracted position the extension member being disposed in close proximity to the upper cross brace member.

17. The trailer of claim 16 wherein the extension member is an inverted, substantially U-shaped member having a downwardly extending first leg and a downwardly extending second leg, said first and second side members of the frame are tubular members, the first side member of the frame adapted to telescopically receive the first leg of the extension member and the second side member of the frame adapted to telescopically receive the second leg of the extension member as the extension member is selectively moved between the extended position and the retracted position.

18. The trailer of claim 17 further comprising:
   a housing connected to the lower frame so as to be substantially centrally disposed adjacent the rearward end of the lower frame;
   a second extension member slideably positioned with the housing and selectively moveable between a retracted position and an extended position, in the retracted position the extension member being disposed within the housing, in the extended position the extension members extending outwardly from the housing and the rearward end of the lower frame;
   third connecting means for securing the extension member in one of the retracted position and the extended position.

19. The trailer of claim 18 further comprising:
   a jack assembly connected to the forward end portion of the lower frame, said jack assembly having an extended mode and a retracted mode, in the extended mode said jack assembly engaging a supporting surface to maintain the trailer in a stable position, in the retracted mode said jack assembly being supported a selected distance above the supporting surface.

20. A trailer for storing and transporting multiple-wheeled motorcycle-type vehicles comprising:
   a substantially horizontally disposed lower frame assembly having a forward end, a medial portion, and a rearward end, the lower frame assembly being capable of receiving at least one of the vehicles thereon;
   at least one transversely disposed axle connected to the lower frame assembly;
   a plurality of wheel assemblies, one of said wheel assemblies operably connected to each end of the axle;
   a first upright support assembly connected to the lower frame assembly in close proximity to the forward end thereof;
   a second upright support assembly connected to the lower frame assembly at a position between the medial portion of the lower frame assembly and the first upright support assembly so as to be disposed in a spatial, substantially parallel relationship with the first upright support assembly;
   an upper frame assembly pivotally connected to the second upright support assembly, said upper frame assembly having a forward end and a rearward end and adapted to receive at least one of said vehicles thereon, said upper frame assembly moveable between a first position and a second position, in the first position the upper frame assembly being disposed substantially parallel to the lower frame assembly such that the forward end of the upper frame assembly is supported by the first upright support assembly, in the second position the upper frame assembly being angularly disposed above the lower frame assembly such that the rearward end of the upper frame assembly is disposed substantially adjacent the lower frame assembly in close proximity to the rearward end of the lower frame assembly;
   lock means for securing the upper frame assembly to the first upright support assembly when the upper frame assembly is in the first position; and
   winch means connected to the lower frame assembly for selectively moving the vehicle on the upper frame assembly to a loaded position and to an unloaded position when the upper frame assembly is disposed in the second position.

21. The trailer of claim 20 further comprising:
   a support platform pivotally connected to the rearward end of the lower frame assembly, said support platform selectively moveable between a first position, a plurality of intermediate second positions, and a third position, in the first position the support platform being disposed substantially adjacent and supported by the lower frame assembly, in one of the second intermediate positions the support platform being disposed substantially normal to the lower frame assembly and the upper frame assembly and supportingly engaging the rearward end of the upper frame assembly, in another of the second intermediate positions the support platform extending outwardly from the rearward end of the lower frame assembly such that the support platform and the lower frame assembly are substantially aligned, and in the third position the support platform extending outwardly from the rearward end of the lower frame assembly and in a downwardly extending direction so as to provide a supporting surface for the vehicle as the vehicle is loaded onto and unloaded from one of the lower frame assembly and the upper frame assembly.

22. The trailer of claim 21 further comprising:
first connector means for connecting the support platform to the upper frame assembly when the support platform is in the second intermediate position and disposed substantially normal to the lower and upper support frame assemblies.

23. The trailer of claim 22 further comprising:
second connector means extendable between the lower frame assembly and the support platform for securing the support platform in the second intermediate position wherein the support platform extends outwardly from the lower frame assembly.

24. The trailer of claim 20 wherein the lower frame assembly further comprises a tongue member extending outwardly from the forward end portion of the lower frame assembly, a distal end of the tongue member connectable to a vehicle for towing the trailer and wherein said winch means comprises:
a winch mounted on the tongue member, said winch having a reel-in mode and a reel-out mode;
a pulley mounted on the forward end of the upper frame assembly so as to be alignable with the winch; and,
a winch line disposable over the pulley, said winch line having a first end and an opposed second end, the first end of the winch line connected to the winch, the second end of the winch line connectable to one of the vehicles when the vehicle is in a position aligned with and substantially adjacent the support platform for loading said vehicle onto the upper frame assembly and for securing the vehicle thereon, and for controllably releasing said vehicle to unload same from the upper frame assembly when the upper frame means is moved to the angularly disposed second position.

25. The trailer of claim 24 further comprising ramp means pivotally connected to the rearward end of the upper frame assembly for stabilizing the upper frame assembly with relation to the lower frame assembly when the upper frame assembly is in the angularly disposed second position and said vehicle is moved onto and from the upper frame assembly, said ramp means moveable between a stored first position and an extended second position, in the stored first position the ramp means being disposed substantially adjacent and supported by the upper frame assembly, in the extended second position the ramp means extending outwardly from the rearward end of the upper frame assembly and disposed adjacent the lower frame assembly when the upper frame assembly is in the angularly disposed second position.

26. The trailer of claim 25 further comprising:
pivot means for pivotally connecting the upper frame assembly to the second support assembly so as to provide selective movement of the upper frame assembly between one of the first position and the second position.

27. The trailer of claim 26 wherein the second upright assembly is positioned and pivotally connected to the upper frame assembly via the pivot means at a position substantially below the center of gravity of the vehicle positioned on the upper frame assembly when the upper frame assembly is in the second position.

28. The trailer of claim 20 further comprising:
a housing connected to the lower frame assembly so as to be substantially centrally disposed adjacent the rearward end of the lower frame assembly;
a second extension member slideably positioned with the housing and selectively moveable between a retracted position and an extended position, in the retracted position the extension member disposed within the housing, in the extended position the extension members extending outwardly from the housing and the rearward end of the lower frame assembly; and,
connector means for securing the extension member in one of the retracted position and the extended second position.

29. The trailer of claim 20 further comprising:
a jack assembly connected to the forward end portion of the lower frame assembly, said jack assembly having an extended mode and a retracted mode, in the extended mode said jack assembly engaging a supporting surface to maintain the trailer in a substantially horizontally disposed stable position, in the retracted mode said jack assembly being supported a selected distance above the supporting surface.

30. The trailer of claim 20 further comprising:
guide means connected to and supported by the first upright support assembly for selectively positioning the forward end of the upper frame assembly on the first upright support assembly and for restricting lateral movement of the upper frame assembly when the upper frame assembly is in the first position.

31. The trailer of claim 21 wherein the lower frame assembly comprises:
a lower frame;
a vehicle supporting floor connected to and supported by the lower frame; and,
a lower rail member connected to and supported by the lower frame and the first and second upright support assemblies, said lower rail member extending along a forward end portion and at least a portion of opposed sides of the lower frame.

32. The trailer of claim 21 wherein the upper frame assembly comprises:
an upper frame;
a vehicle supporting floor member connected to and supported by the upper frame; and,
an upper rail member connected to and supported by the upper frame such that the upper rail member extends along a forward end portion and the opposed sides of the upper frame.

33. The trailer of claim 32 wherein the upper rail member extending along the forward end portion of the upper frame is provided with a height greater than the height of the upper rail member extending along the sides of the upper frame.

34. The trailer of claim 33 wherein the upper rail member extending along the forward end portion of the upper frame is angularly disposed in a forward direction with relation to the vehicle supporting floor member, and the angularly disposed portion of the upper rail member is provided with a height substantially equal to the height of wheels of the vehicle positioned on the vehicle supporting floor member.

35. The trailer of claim 34 wherein the vehicle supported by the vehicle supporting floor member of the upper frame means is a four-wheeled vehicle and the vehicle supporting floor member comprises:
   an elongated first floor section extending the length of the upper frame; and,
   a substantially parallel, spatially disposed elongated second section extending the length of the upper frame, the first and second floor sections adapted to receive and support thereon the wheels of the vehicle.

36. The trailer of claim 35 further comprising:
   a second rail member connected to and supported by the upper frame so as to be disposed substantially adjacent interiorly disposed sides of the first and second sections of the vehicle supporting floor member.

37. The trailer of claim 36 wherein the upper rail member extending along the forward end portion of the upper frame comprises:
   a first angularly disposed member connected to and supported by the upper frame so as to be aligned with the first floor section; and,
   a second angularly disposed member connected to and supported by the upper frame so as to be aligned with the second floor section.

38. The trailer of claim 21 wherein the support platform comprises:
   a frame having a first side member, a substantially parallel, spatially disposed second side member, an upper cross brace member and a lower cross brace member, the upper cross brace member extending between and connected to the first and second side member so as to be disposed substantially adjacent an upper end of said first and second side members, the lower cross brace member extending between and connected to the first and second side member so as to be disposed substantially adjacent a lower end of said first and second side members; and,
   a platform floor member connected to and supported by the frame.

39. The trailer of claim 38 wherein the support platform further comprises:
   an extension member supported by the first and second side member of the frame, said extension member moveable between an extended position and a retracted position, in the extended position the extension member being positionable substantially adjacent the rearward end of the upper frame and connectable thereto when the support platform is in a second intermediate position so as to be substantially normal to the lower frame and the upper frame is in the first position, in the retracted position the extension member being disposed and in close proximity to the upper cross brace member; and
   connector means for connecting the extension member to the upper frame when the extension member is in the extended position and disposed substantially adjacent the rearward end of the upper frame.

40. The trailer of claim 39 wherein the extension member is an inverted, substantially U-shaped member having a downardly extending first leg and a downwardly extending second leg, said first and second side members of the frame are tubular members, the first side member of the frame adapted to telescopically receive the first leg of the extension member and the second side member of the frame adapted to telescopically receive the second leg of the extension member as the extension member is selectively moved between the extended position and the retracted position.

* * * * *